United States Patent
Ng et al.

(10) Patent No.: US 10,348,458 B2
(45) Date of Patent: Jul. 9, 2019

(54) METHODS AND APPARATUS FOR LTE COORDINATED TRANSMISSION ON UNLICENSED SPECTRUM

(71) Applicant: Samsung Electronics Co., Ltd, Suwon-si (KR)

(72) Inventors: Boon Loong Ng, Plano, TX (US); Thomas David Novlan, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 131 days.

(21) Appl. No.: 15/061,740

(22) Filed: Mar. 4, 2016

(65) Prior Publication Data

US 2016/0270100 A1    Sep. 15, 2016

Related U.S. Application Data

(60) Provisional application No. 62/251,456, filed on Nov. 5, 2015, provisional application No. 62/132,911, filed on Mar. 13, 2015.

(51) Int. Cl.
    *H04W 4/00*    (2018.01)
    *H04L 1/18*    (2006.01)
    (Continued)

(52) U.S. Cl.
    CPC ............ *H04L 1/1887* (2013.01); *H04L 5/001* (2013.01); *H04L 5/008* (2013.01); *H04L 5/0035* (2013.01);
    (Continued)

(58) Field of Classification Search
    CPC ............ H04W 72/12; H04W 72/1231; H04W 74/0808; H04L 1/18; H04L 5/00;
    (Continued)

(56) References Cited

U.S. PATENT DOCUMENTS

2007/0177630 A1* 8/2007 Ranta .................... H04L 1/1685
                                                            370/473
2010/0142375 A1* 6/2010 Portoles Comeras ......................
                                                           H04L 43/0894
                                                            370/235

(Continued)

FOREIGN PATENT DOCUMENTS

| WO | 2011116240 A1 | 9/2011 |
| WO | 2012114150 A1 | 8/2012 |
| WO | 2013179095 A1 | 12/2013 |

OTHER PUBLICATIONS

3GPP TSG RAN WG1 Meeting #80, R1-150044, Feb. 9-13, 2015.*
(Continued)

*Primary Examiner* — Yemane Mesfin
*Assistant Examiner* — Abdelillah Elmejjarmi

(57) ABSTRACT

A method for a coordinated transmission in a wireless communication system. The method includes processing feedback information from multiple transmit points (TPs) operating in license assisted access (LAA) cells, generating scheduling information for the coordinated transmission by the multiple TPs to a user equipment (UE) in accordance with the feedback information, transmitting the scheduling information to the multiple TPs, and receiving the feedback information from the multiple TPs.

18 Claims, 11 Drawing Sheets

(51) Int. Cl.
    *H04W 72/12*     (2009.01)
    *H04L 5/00*     (2006.01)
    *H04L 27/00*     (2006.01)
    *H04W 16/14*     (2009.01)
    *H04W 74/08*     (2009.01)

(52) U.S. Cl.
    CPC .......... *H04L 5/0044* (2013.01); *H04L 5/0092* (2013.01); *H04L 27/0006* (2013.01); *H04W 72/1231* (2013.01); *H04L 5/0023* (2013.01); *H04L 5/0053* (2013.01); *H04W 16/14* (2013.01); *H04W 74/0808* (2013.01)

(58) Field of Classification Search
    CPC ... H04L 5/0053; H04L 5/0035; H04L 5/0023; H04L 5/008; H04L 5/0092; H04L 5/0044; H04L 5/001
    See application file for complete search history.

(56) References Cited

U.S. PATENT DOCUMENTS

| | | | |
|---|---|---|---|
| 2012/0147815 A1* | 6/2012 | Meyer | H04B 7/022 370/328 |
| 2013/0114524 A1 | 5/2013 | Sirotkin et al. | |
| 2013/0258896 A1 | 10/2013 | Park et al. | |
| 2013/0288730 A1 | 10/2013 | Gomadam et al. | |
| 2014/0022925 A1* | 1/2014 | Cili | H04W 24/08 370/252 |
| 2014/0133325 A1 | 5/2014 | Prasad et al. | |
| 2014/0269627 A1* | 9/2014 | Gorokhov | H04W 72/0446 370/336 |
| 2014/0293914 A1* | 10/2014 | Maattanen | H04W 72/1278 370/329 |
| 2015/0180627 A1* | 6/2015 | Nammi | H04W 72/1231 370/329 |
| 2016/0227571 A1* | 8/2016 | Baek | H04W 16/14 |
| 2017/0215205 A1* | 7/2017 | Takeda | H04W 74/0816 |

OTHER PUBLICATIONS

International Search Report dated Jul. 8, 2016 in connection with International Application No. PCT/KR2016/002483, 3 pages.
Written Opinion of the International Searching Authority dated Jul. 8, 2016 in connection with International Application No. PCT/KR2016/002483, 7 pages.
Huawei, et al., "Considerations of Measurement Issues in LAA", 3GPP TSG-RAN WG2 Meeting #89, R2-150249, Athens, Greece, Feb. 9-12, 2015, 5 pages.
3GPP TR 36.872 V12.1.0—Technical Report 3rd Generation Partnership Project; Technical Specification Group Radio Access Network; Small cell enhancements for E-UTRA and E-UTRAN—Physical layer aspects, Dec. 2013—100 Pages.
3GPP TR 36.872 V12.1.0 Technical Report 3rd Generation Partnership Project; Technical Specification Group Radio Access Network; Small cell enhancements for E-UTRA and E-UTRAN—Physical layer aspects, Dec. 2013—810 Pages.
3GPP TS 36.211 V12.3.0 Technical Specification 3rd Generation Partnership Project; Technical Specification Group Radio Access Network; Evolved Universal Terrestrial Radio Access (E-UTRA); Physical channels and modulation, Sep. 2014—124 Pages.
3GPP TS 36.212 V12.2.0 Technical Specification 3rd Generation Partnership Project; Technical Specification Group Radio Access Network; Evolved Universal Terrestrial Radio Access (E-UTRA); Multiplexing and channel coding, Sep. 2014—89 Pages.
ETSI TS 136 213 V12.3.0 LTE; Evolved Universal Terrestrial Radio Access (E-UTRA); (3GPP TS 36.213 version 12.3.0, Oct. 2014—214 Pages.
3GPP TS 36.331 V12.3.0 (Sep. 2014) Technical Specification 3rd Generation Partnership Project; Technical Specification Group Radio Access Network; Evolved Universal Terrestrial Radio Access (E-UTRA); Radio Resource Control (RRC); Protocol specification, Sep. 2014—378 Pages.
LG Electronics; "Candidate solutions for LAA operation"; 3GPP TSG RAN WG1 Meeting #78bis; Ljubljana, Slovenia; Oct. 6-10, 2014; 6 pages.
Foreign Communication from Related Counterpart Application; European Patent Application No. 16765210.6; Extended European Search Report and European Search Opinion dated Feb. 14, 2018; 12 pages.

* cited by examiner

METHODS AND APPARATUS FOR LTE COORDINATED TRANSMISSION ON UNLICENSED SPECTRUM

CROSS-REFERENCE TO RELATED APPLICATION(S) AND CLAIM OF PRIORITY

This application claims priority under 35 U.S.C. § 119(e) to U.S. Provisional Patent Application No. 62/132,911 filed on Mar. 13, 2015, entitled "METHODS AND APPARATUS FOR LTE COORDINATED TRANSMISSION ON UNLICENSED SPECTRUM" and U.S. Provisional Patent No. 62/251,456 filed on Nov. 5, 2015 entitled "METHOD AND APPARATUS FOR LTE UE PROCEDURES ON UNLICENSED SPECTRUM." The above-identified provisional patent application is hereby incorporated by reference in its entirety.

TECHNICAL FIELD

This disclosure relates generally to wireless communication systems. More specifically, this disclosure relates to method and apparatus for LTE coordinated transmission on unlicensed spectrum.

BACKGROUND

A long term evolution (LTE) radio access technology (RAT) may be deployed on an unlicensed frequency spectrum, which is also known as licensed assisted access (LAA) or LTE unlicensed (LTE-U). One of possible deployment scenarios for the LAA is to deploy LAA carriers as a part of carrier aggregations, where an LAA carrier is aggregated with another carrier on a licensed frequency spectrum. In a conventional scheme, a carrier on a licensed frequency spectrum is assigned as a primary cell (PCell) and a carrier on an unlicensed frequency spectrum is assigned as a secondary cell (SCell) for a UE. Since there may be other RATs operating on the same unlicensed frequency spectrum as the LAA carrier, there is a need to enable co-existence of other RAT with LAA on an unlicensed frequency spectrum without undesirable interference between heterogeneous RATs.

SUMMARY

This disclosure provides method and apparatus for LTE coordinated transmission on unlicensed spectrum.

In one embodiment, a network entity (NE) is provided. The NE comprises at least one processor configured to process feedback information from multiple transmit points (TPs) operating in license assisted access (LAA) cells and generate scheduling information for a coordinated transmission by the multiple TPs to a user equipment (UE) in accordance with the feedback information. The NE further comprises a communication interface configured to transmit the scheduling information to the multiple TPs and receive the feedback information from the multiple TPs.

In another embodiment, a first transmit point (TP) operating in a first licensed assisted access (LAA) cell is provided. The first TP comprises at least one processor configured to establish a connection with a second TP operating in a second license assisted access (LAA) cell to perform a coordinated transmission to a user equipment (UE), generate inter-TP coordinated information in accordance with an inter-TP coordinated scheme between the first and second TPs. The first TP further comprises, and process feedback information received from the UE that belongs to the first TP and the second TP. The first TP further comprises a communication interface configured to transmit the feedback information to a network entity (NE) and receive scheduling information from the NE based on the feedback information, wherein the scheduling information includes TP-selection information.

In another embodiment, a method for a coordinated transmission in a wireless communication system is provided. The method includes processing feedback information from multiple transmit points (TPs) operating in license assisted access (LAA) cells, generating scheduling information for the coordinated transmission by the multiple TPs to a user equipment (UE) in accordance with the feedback information, transmitting the scheduling information to the multiple TPs, and receiving the feedback information from the multiple TPs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 13, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

The following documents and standards descriptions are hereby incorporated by reference into the present disclosure as if fully set forth herein: 3GPP TS 36.211 v12.3.0, "E-UTRA, Physical channels and modulation" (REF1); 3GPP TS 36.212 v12.2.0, "E-UTRA, Multiplexing and Channel coding" (REF2); 3GPP TS 36.213 v12.3.0, "E-UTRA, Physical Layer Procedures" (REF3); 3GPP TR 36.872 v12.1.0, "Small cell enhancements for E-UTRA and E-UTRAN—Physical layer aspects" (REF4); 3GPP TS 36.133 v12.5.0, "E-UTRA, Requirements for support of radio resource management" (REF5); 3GPP TS 36.331 v12.3.0, "E-UTRA, Radio Resource Control (RRC) Protocol Specification" (REF6); ETSI EN 301 893 v1.7.1 (2012-06), Harmonized European Standard, "Broadband Radio Access Networks (BRAN); 5 GHz high performance RLAN" (REF7); and "METHOD TO SUPPORT INTER-ENODEB COMP," Prosecution ID WD-201301-016-1-US0. (REF 8)

FIGS. 1-5B below describe various embodiments implemented in wireless communications systems and with the use of orthogonal frequency division multiplexing (OFDM) or orthogonal frequency division multiple access (OFDMA) communication techniques. The descriptions of FIGS. 1-4 are not meant to imply physical or architectural limitations to the manner in which different embodiments may be implemented. Different embodiments of the present disclosure may be implemented in any suitably-arranged communications system.

Figure 1:
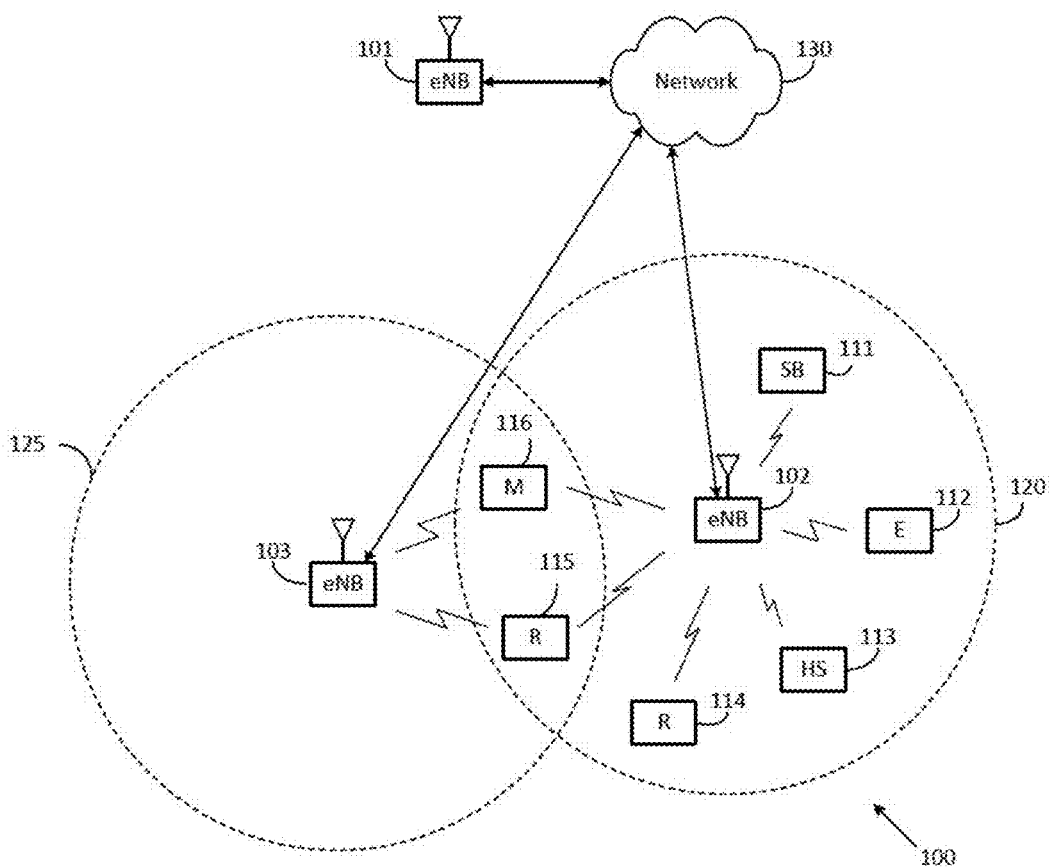
FIG. 1 illustrates an example wireless network according to embodiments of the present disclosure.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

In one embodiment, the eNB 101-103 may be implement as a network entity (NE)

In such embodiment, the NE 101-103 process feedback information from multiple transmit points (TPs) (not shown in FIG. 1) operating in license assisted access (LAA) cells, generate scheduling information for the coordinated transmission by the multiple TPs to a user equipment (UE) 111-116 in accordance with the feedback information, transmit the scheduling information to the multiple TPs, and receiving the feedback information from the multiple TPs. In addition, the NE 101-103 segments data packet into a plurality of transport blocks (TBs) in accordance with the feedback information received from the multiple TPs and schedules a number of the TBs to be transmitted to the UE through the multiple TPs. Furthermore, the NE 101-103 selects the multiple TPs that perform the coordinated transmission to the UE in accordance with the feedback information.

In another embodiment, the eNB 101-103 may be implemented as a transmit point (TP). In such embodiment, the TP 101-103 establish a connection with a neighbor TP operating in a second license assisted access (LAA) cell to perform a coordinated transmission to a user equipment (UE) 111-116. For example, the TP 103 is coordinated with the TP 102 to generate inter-TP coordinated information in accordance with an inter-TP coordinated scheme between the TP 103 and the TP 102, and process feedback information received from the UEs 111-116 that belongs to the TP 103 and the TP 102. In addition, the TP 101-103 transmit the feedback information to a network entity (NE) (not shown in FIG. 1) and receive scheduling information from the NE based on the feedback information. In addition, the TPs 101-103 receive data packet that is segmented into a plurality of transport blocks (TBs) from the NE, wherein the plurality of TBs is segmented in accordance with the feedback information, and transmit the plurality of TBs to the UE in accordance with the scheduling information received from the NE. In one example, the NE and the TP may be connected with a wireless communication protocol. In another example, the NE and the TPs may be connected with a wired communication protocol.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, LTE-U(LAA) or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for processing of LTE coordinated transmission on unlicensed spectrum. In certain embodiments, and one or more of the eNBs 101-103 includes circuitry, programming, or a combination thereof, for processing of LTE coordinated transmission on unlicensed spectrum.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

Figure 2:
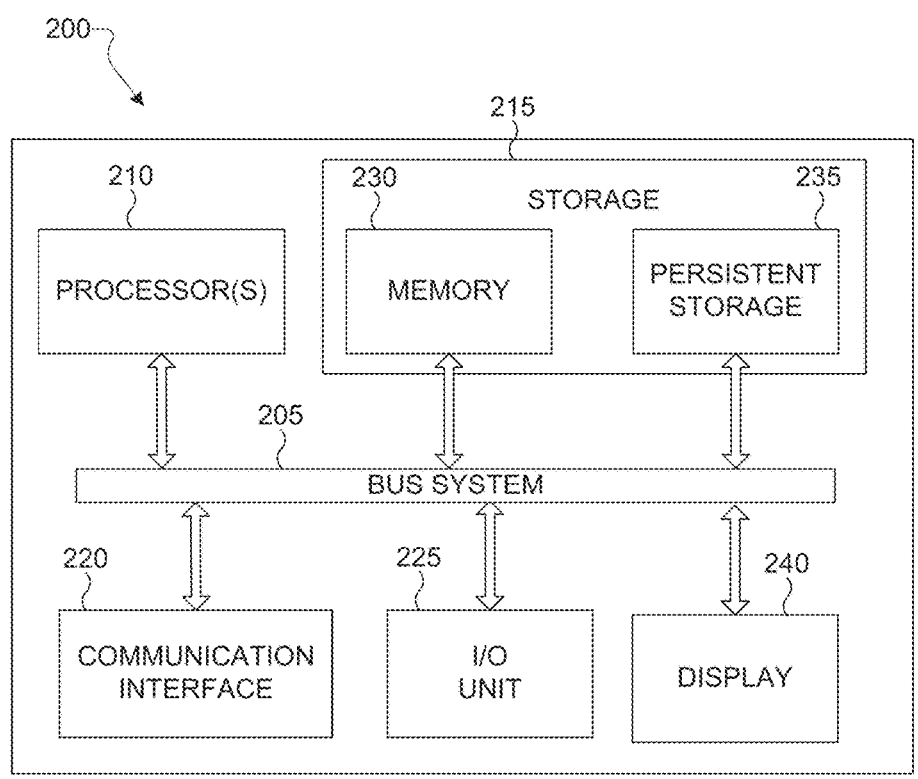
FIG. 2 illustrates an example network entity (NE) according to embodiments of the present disclosure.
Figure 3:
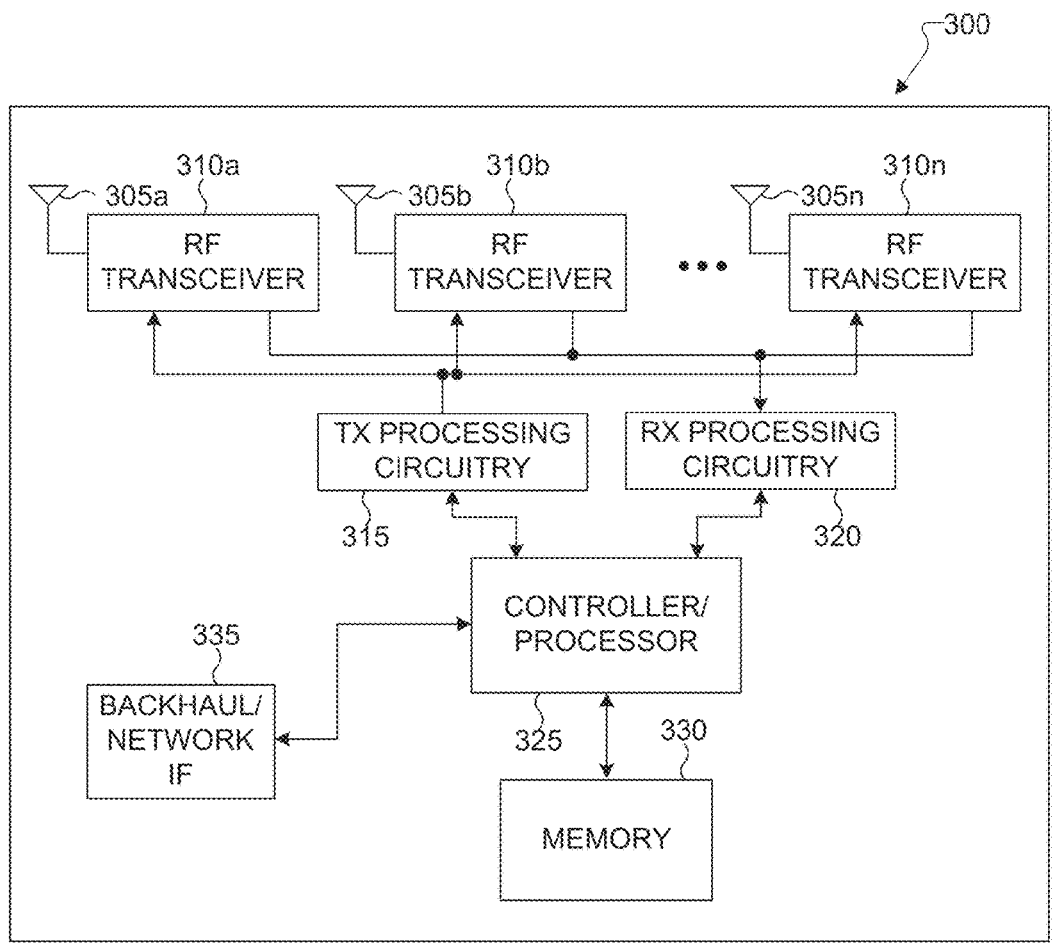
FIG. 3 illustrates an example transmit point (TP) according to embodiments of the present disclosure.

FIG. 2 illustrate example network entity (NE) 200 according to the present disclosure. The embodiment of the NE 200 illustrated in FIG. 2 is for illustration only. However, FIG. 2 does not limit the scope of this disclosure to any particular implementation of the NE. In one embodiment, the NE may be implemented as an eNodeB 101-103 as shown in FIG. 1 and FIG. 3.

As shown in FIG. 2, the NE 200 includes a bus system 205, which supports communication between at least one processor 210, at least one storage 215, at least one communication interface 220, at least one input/output (I/O) unit 225, and at least one display 240.

The processor 210 executes instructions that may be loaded into a memory 230. The processor 210 may include any suitable number(s) and type(s) of processors or other devices in any suitable arrangement. Example types of the processor 210 include microprocessors, microcontrollers, digital signal processors, field programmable gate arrays, application specific integrated circuits, discreet circuitry, and video stream processors. In one embodiment, the processor 210 processes feedback information from multiple transmit points (TPs) operating in license assisted access (LAA) cells and generates scheduling information for a coordinated transmission by the multiple. In addition, the processor 210 is further configured to segment data packet into a plurality of transport blocks (TBs) in accordance with the feedback information received from the multiple TPs and schedule a number of the TBs to be transmitted to the UE through the multiple TPs.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, flash memory, or optical disc. The display 240 may include a panel, a hologram device, or a projector to display any object (such as a text, a video, an image, a graphic and/or other suitable information). The storage device 215 includes a program code The communication interface 220 supports communications with other systems or devices. For example, the communication interface 220 could include a network interface card or a wireless transceiver facilitating communications over the network 102. The communication interface 220 may support communications through any suitable physical or wireless communication link(s). In one embodiment, the communication interface 220 is configured to transmit the scheduling information to the multiple TPs and receive the feedback information from the multiple TPs.

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

FIG. 3 illustrates an example transmit point (TP) 300 according to embodiments of the present disclosure. The embodiment of the TP 300 illustrated in FIG. 3 is for illustration only. However, the TP 300 comes in a wide variety of configurations, and FIG. 3 does not limit the scope of this disclosure to any particular implementation of a TP.

In one embodiment, the TP 300 may be implemented as an independent system or device that is connected with the eNB 101-103. In such embodiment, the eNB 101-103 may be implemented as the NE 200.

As shown in FIG. 3, the TP 300 includes multiple antennas 305a-305n, multiple RF transceivers 310a-310n, transmit (TX) processing circuitry 315, and receive (RX) processing circuitry 320. The TP 300 also includes a controller/processor 325, a memory 330, and a backhaul or network interface 335.

The RF transceivers 310a-310n receive, from the antennas 305a-305n, incoming RF signals, such as signals transmitted by UEs in the network 100. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n. In some embodiment, the RF transceivers 310a-310n are configure to transmit feedback information to a network entity (NE) and receive scheduling information from the NE based on the feedback information. The scheduling information includes TP-selection information. In addition, the RF transceiver 310a-310n are further configured to receive data packet that is segmented into a plurality of transport blocks (TBs) from the NE. The plurality of TBs is segmented in accordance with the feedback information. The RF transceiver 310a-310n are further configured to transmit the plurality of TBs to the UE in accordance with the scheduling information received from the NE.

The controller/processor 325 can include one or more processors or other processing devices that control the overall operation of the TP 300. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the TP 300 by the controller/processor 325. In some embodiments, the controller/processor 325 includes at least one microprocessor or microcontroller. In some embodiments, the controller/processor 325 is configured to establish a connection with a second TP operating in a second license assisted access (LAA) cell to perform a coordinated transmission to a user equipment (UE) and generate inter-TP coordinated information in accordance with an inter-TP coordinated scheme between the first and second TPs.

As described in more detail below, the TP 300 includes circuitry, programming, or a combination thereof for processing of LTE coordinated transmission on unlicensed spectrum.

In some embodiments, the TP 300 establishes a connection with a second TP operating in a second license assisted access (LAA) cell to perform a coordinated transmission to a user equipment (UE), generates inter-TP coordinated information in accordance with an inter-TP coordinated scheme between the first and second TPs, and processes feedback information received from the UE that belongs to the first TP and the second TP. In addition, the TP transmits the feedback information to a network entity (NE) and receive scheduling information from the NE based on the feedback information, wherein the scheduling information includes TP-selection information. In some embodiments, the TP 300 receives data packet that is segmented into a plurality of transport blocks (TBs) from the NE, the plurality of TBs being segmented in accordance with the feedback information and transmits the plurality of TBs to the UE in accordance with the scheduling information received from the NE.

For example, controller/processor 325 can be configured to execute one or more instructions, stored in memory 330, that are configured to cause the controller/processor to process coordinated transmission on unlicensed spectrum.

The controller/processor 325 is also capable of executing programs and other processes resident in the memory 330, such as an OS. The controller/processor 325 can move data into or out of the memory 330 as required by an executing process.

The controller/processor 325 is also coupled to the backhaul or network interface 335. The backhaul or network interface 335 allows the TP 300 to communicate with other devices or systems over a backhaul connection or over a network. The interface 335 could support communications over any suitable wired or wireless connection(s). For example, when the TP 300 is implemented as part of a cellular communication system (such as one supporting 5G, LTE, LTE-A, or LTE-U(LAA))), the interface 335 could allow the TP 302 to communicate with other TPs over a wired or wireless backhaul connection. When the TP 300 is implemented as an access point, the interface 335 could allow the TP 300 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a flash memory or other ROM.

Although FIG. 3 illustrates one example of TP 300, various changes may be made to FIG. 3. For example, the TP 300 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the TP 300 could include multiple instances of each (such as one per RF transceiver). Also, various components in FIG. 3 could be combined, further subdivided, or omitted and additional components could be added according to particular needs.

Figure 4:
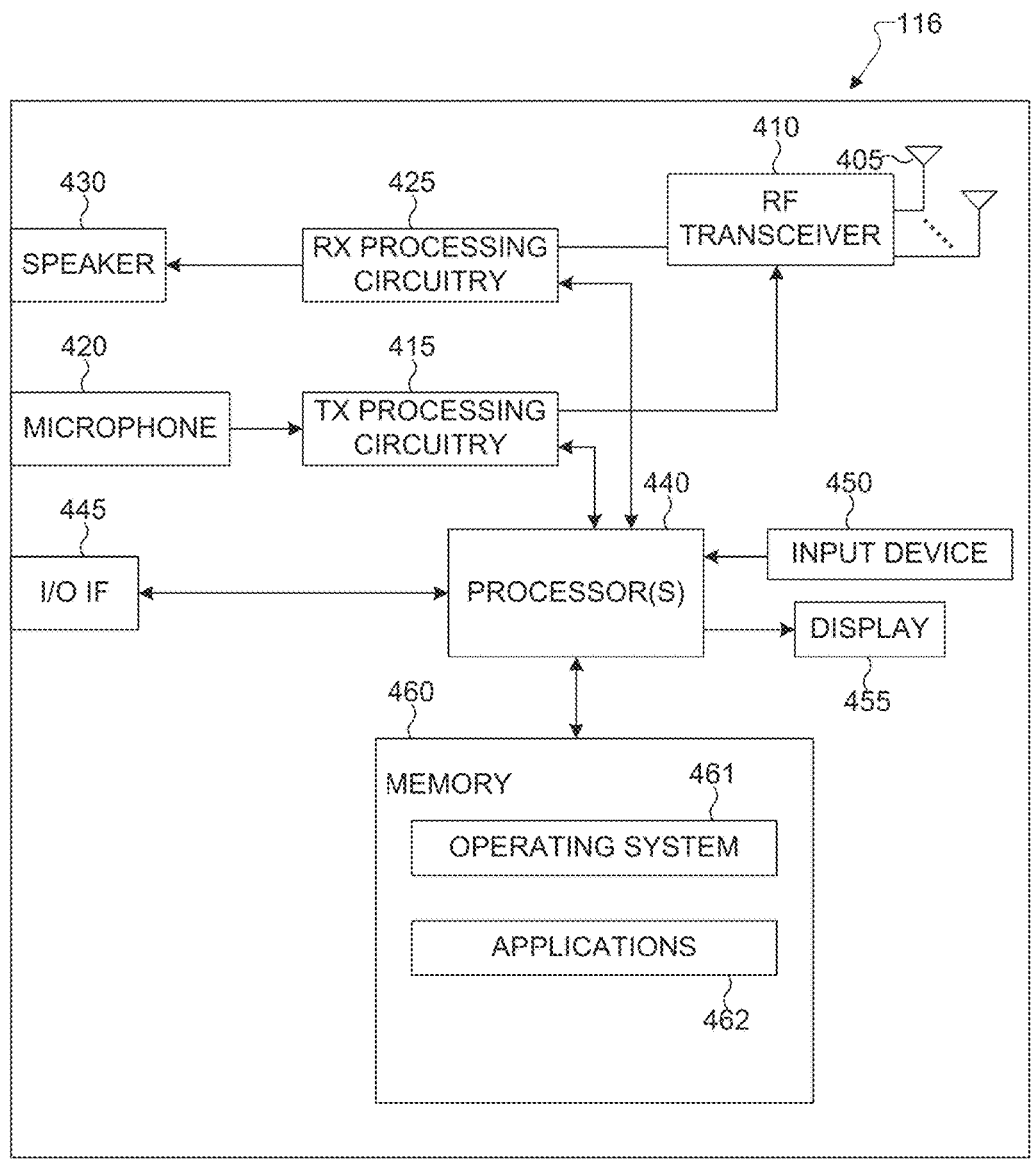
FIG. 4 illustrates an example user equipment (UE) according to embodiments of the present disclosure.

FIG. 4 illustrates an example UE 116 according to embodiments of the present disclosure. The embodiment of the UE 116 illustrated in FIG. 4 is for illustration only, and the UEs 111-115 of FIG. 1 could have the same or similar configuration. However, UEs come in a wide variety of configurations, and FIG. 4 does not limit the scope of this disclosure to any particular implementation of a UE.

As shown in FIG. 4, the UE 116 includes a set of antennas 405, a radio frequency (RF) transceiver 410, TX processing circuitry 415, a microphone 420, and receive (RX) processing circuitry 425. The UE 116 also includes a speaker 430, a processor 440, an input/output (I/O) interface (IF) 445, an input device 450, a display 455, and a memory 460. The memory 460 includes an operating system (OS) 461 and one or more applications 462.

The RF transceiver 410 receives, from the set of antennas 405, an incoming RF signal transmitted by an eNB of the network 100. The RF transceiver 410 down-converts the incoming RF signal to generate an intermediate frequency (IF) or baseband signal. In some embodiments, the RF transceiver 410 receives data packet that is segmented into a plurality of TBs from multiple TPs as illustrated in FIG. 3. The RF transceiver 410 also transmits feedback information to the multiple TPs. The feedback information includes channel state information that is measured from downlink channel received from the multiple TPs. In one example, the RF transceiver 410 of the UE 116 receives the same TB from the multiple TPs. In another example, the RF transceiver 410 of the UE 116 receives different TBs from the multiple TPs.

The IF or baseband signal is sent to the RX processing circuitry 425, which generates a processed baseband signal by filtering, decoding, and/or digitizing the baseband or IF signal. The RX processing circuitry 425 transmits the processed baseband signal to the speaker 430 (such as for voice data) or to the processor 440 for further processing (such as for web browsing data).

The TX processing circuitry 415 receives analog or digital voice data from the microphone 420 or other outgoing baseband data (such as web data, e-mail, or interactive video game data) from the processor 440. The TX processing circuitry 415 encodes, multiplexes, and/or digitizes the outgoing baseband data to generate a processed baseband or IF signal. The RF transceiver 410 receives the outgoing processed baseband or IF signal from the TX processing circuitry 415 and up-converts the baseband or IF signal to an RF signal that is transmitted via the antenna 405.

The processor 440 can include one or more processors or other processing devices and execute the OS 361 stored in the memory 460 in order to control the overall operation of the UE 116. For example, the processor 440 could control the reception of forward channel signals and the transmission of reverse channel signals by the RF transceiver 410, the RX processing circuitry 425, and the TX processing circuitry 415 in accordance with well-known principles. In some embodiments, the processor 440 includes at least one microprocessor or microcontroller.

The processor 440 can move data into or out of the memory 460 as required by an executing process. In some embodiments, the processor 440 is configured to execute the applications 462 based on the OS 361 or in response to signals received from NEs or an operator. The processor 440 is also coupled to the I/O interface 445, which provides the UE 116 with the ability to connect to other devices, such as laptop computers and handheld computers. The I/O interface 445 is the communication path between these accessories and the processor 440.

The processor 440 is also coupled to the input device 450 and the display 455. The operator of the UE 116 can use the input device 450 to enter data into the UE 116. The display 455 may be a liquid crystal display, light emitting diode display, or other display capable of rendering text and/or at least limited graphics, such as from web sites.

The memory 460 is coupled to the processor 440. Part of the memory 460 could include a random access memory (RAM), and another part of the memory 460 could include a Flash memory or other read-only memory (ROM).

Although FIG. 4 illustrates one example of UE 116, various changes may be made to FIG. 4. For example, various components in FIG. 4 could be combined, further subdivided, or omitted and additional components could be added according to particular needs. As a particular example, the processor 440 could be divided into multiple processors, such as one or more central processing units (CPUs) and one or more graphics processing units (GPUs). In another example, the UE 116 may include only one antenna 405 or any number of antennas 405. Also, while FIG. 4 illustrates the UE 116 configured as a mobile telephone or smartphone, UEs could be configured to operate as other types of mobile or stationary devices.

Figure 5A:
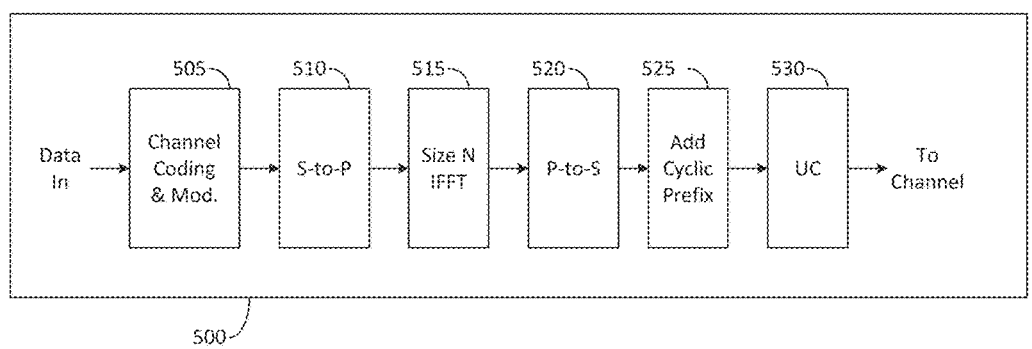
FIG. 5A illustrates a high-level diagram of an orthogonal frequency division multiple access transmit path according to embodiments of the present disclosure.
Figure 5B:
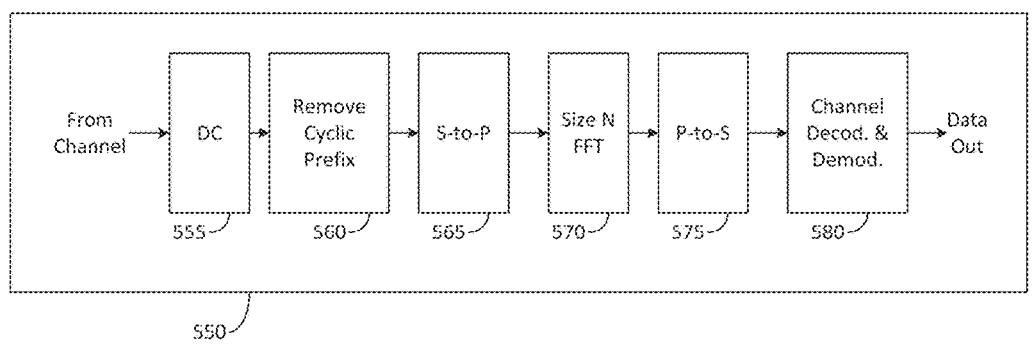
FIG. 5B illustrates a high-level diagram of an orthogonal frequency division multiple access receive path according to embodiments of the present disclosure.

FIG. 5A is a high-level diagram of transmit path circuitry 500. For example, the transmit path circuitry 500 may be used for an OFDMA communication. FIG. 5B is a high-level diagram of receive path circuitry 550. For example, the receive path circuitry 550 may be used for an OFDMA communication. In FIGS. 5A and 5B, for downlink communication, the transmit path circuitry 500 can be implemented in a base station (eNB) 102, a network entity (NE) 200, a transmit point 300, or a relay station, and the receive path circuitry 550 may be implemented in a user equipment (such as user equipment 116 of FIG. 1). In other examples, for uplink communication, the receive path circuitry 550 can be implemented in a base station (such as 102 of FIG. 1) or a relay station, and the transmit path circuitry 500 can be implemented in a user equipment (such as user equipment 116 of FIG. 1).

Transmit path circuitry 500 comprises channel coding and modulation block 505, serial-to-parallel (S-to-P) block 510, Size N Inverse Fast Fourier Transform (IFFT) block 515, parallel-to-serial (P-to-S) block 520, add cyclic prefix block 525, and up-converter (UC) 530. Receive path circuitry 550 comprises down-converter (DC) 555, remove cyclic prefix block 560, serial-to-parallel (S-to-P) block 565, Size N Fast Fourier Transform (FFT) block 570, parallel-to-serial (P-to-S) block 575, and channel decoding and demodulation block 580.

At least some of the components in FIGS. 5A and 5B can be implemented in software, while other components can be implemented by configurable hardware or a mixture of software and configurable hardware. In particular, it is noted that the FFT blocks and the IFFT blocks described in this disclosure document can be implemented as configurable software algorithms, where the value of Size N can be modified according to the implementation.

In transmit path circuitry 500, channel coding and modulation block 505 receives a set of information bits, applies coding (such as low-density parity-check (LDPC) coding) and modulates (such as Quadrature Phase Shift Keying (QPSK) or Quadrature Amplitude Modulation (QAM)) the input bits to produce a sequence of frequency-domain modulation symbols. Serial-to-parallel block 510 converts (such as de-multiplexes) the serial modulated symbols to parallel data to produce N parallel symbol streams where N is the IFFT/FFT size used in BS 102 and UE 116. Size N IFFT block 515 then performs an IFFT operation on the N parallel symbol streams to produce time-domain output signals. Parallel-to-serial block 520 converts (such as multiplexes) the parallel time-domain output symbols from Size N IFFT block 515 to produce a serial time-domain signal. Add cyclic prefix block 525 then inserts a cyclic prefix to the time-domain signal. Finally, up-converter 530 modulates (such as up-converts) the output of add cyclic prefix block 525 to RF frequency for transmission via a wireless channel. The signal can also be filtered at baseband before conversion to RF frequency.

The transmitted RF signal arrives at UE 116 after passing through the wireless channel, and reverse operations to those at eNB 102 or TP 300 are performed. Down-converter 555 down-converts the received signal to baseband frequency, and remove cyclic prefix block 560 removes the cyclic prefix to produce the serial time-domain baseband signal. Serial-to-parallel block 565 converts the time-domain baseband signal to parallel time-domain signals. Size N FFT block 570 then performs an FFT algorithm to produce N parallel frequency-domain signals. Parallel-to-serial block 575 converts the parallel frequency-domain signals to a sequence of modulated data symbols. Channel decoding and demodulation block 580 demodulates and then decodes the modulated symbols to recover the original input data stream.

Each of eNBs 101-103 can implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Figure 6:
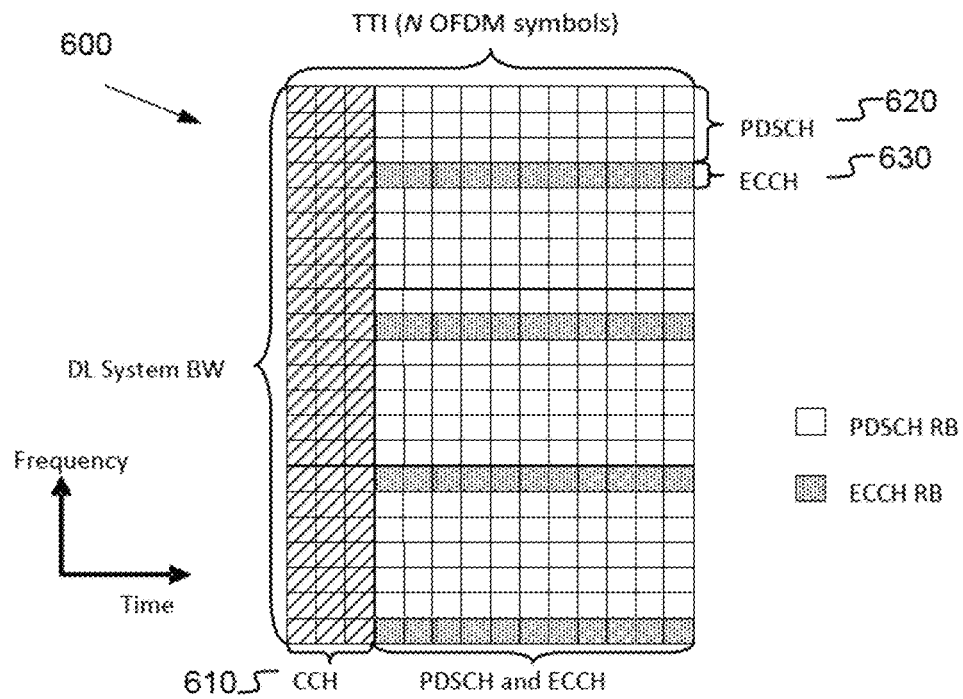
FIG. 6 illustrates an example structure for a downlink (DL) transmission time interval (TTI) according to embodiments of the present disclosure.

FIG. 6 illustrates an example structure for a DL TTI 600 according to embodiments of the present disclosure. An embodiment of the DL TTI structure 600 shown in FIG. 6 is for illustration only. Other embodiments can be used without departing from the scope of the present disclosure.

As illustrated in FIG. 6, a DL signaling uses OFDM and a DL TTI includes N=14 OFDM symbols in the time domain and K resource blocks (RBs) in the frequency domain. A first type of control channels (CCHs) is transmitted in a first N1 OFDM symbols 610 including no transmission, N1=0. Remaining N–N1 OFDM symbols are primarily used for transmitting PDSCHs 620 and, in some RBs of a TTI, for transmitting a second type of CCHs (ECCHs) 630.

An eNB 103 or TP 300 also transmits primary synchronization signals (PSS) and secondary synchronization signals (SSS), so that UE 116 synchronizes with the eNB 103 or TP 300 and performs cell identification. There are 504 unique physical-layer cell identities. The physical-layer cell identities are grouped into 168 unique physical-layer cell-identity groups which of each group contains three unique identities. The grouping is such that each physical-layer cell identity is part of one and only one physical-layer cell-identity group. A physical-layer cell identity $N_{ID}^{cell}=3N_{ID}^{(1)}+N_{ID}^{(2)}$ is thus uniquely defined by a number $N_{ID}^{(1)}$ in the range of 0 to 167, representing the physical-layer cell-identity group, and a number $N_{ID}^{(1)}$ in the range of 0 to 2, representing the physical-layer identity within the physical-layer cell-identity group. Detecting a PSS enables a UE 116 to determine the physical-layer identity as well as a slot timing of the cell transmitting the PSS. Detecting a SSS enables the UE 116 to determine a radio frame timing, the physical-layer cell identity, a cyclic prefix length as well as the cell uses ether a frequency division duplex (FDD) or a time division duplex (TDD) scheme.

In a TDD communication system, some TTIs are used for an uplink transmission and a downlink transmission as a communication direction. Table 1 lists indicative TDD DL-UL configurations over a period of 10 TTIs that is also referred to as frame period. In Table 1, "D" denotes a DL TTI, "U" denotes a UL TTI, and "S" denotes a special TTI that includes a DL transmission field referred to as a downlink pilot time slot (DwPTS), a guard period (GP), and a UL transmission field referred to as an uplink pilot time slot (UpPTS). Several combinations exist for duration of each field in a special TTI subject to the condition that the total duration is one TTI.

TABLE 1

| TDD DL-UL Configuration | DL-to-UL Switch-point periodicity | TTI number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

There are at least two listen-before-talk (LBT) protocols that may meet the European telecommunication standards institute (ETSI) regulatory requirements. In one example, an LBT protocol is used for a frame-based equipment. In another example, an LBT protocol is used for a load-based equipment.

Figure 7:
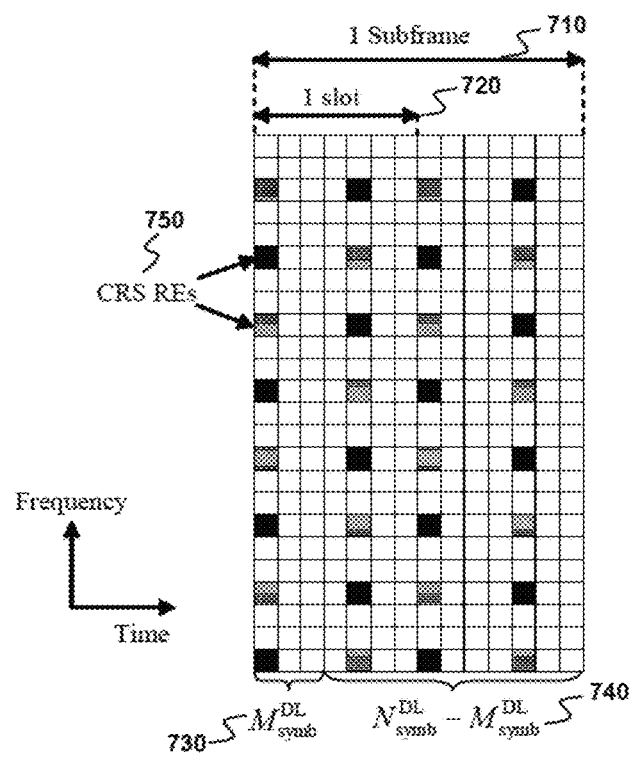
FIG. 7 illustrates an example structure for a common reference signal resource element (CRS RE) mapping according to embodiments of the present disclosure.

FIG. 7 illustrates an example structure for a CRS RE mapping 700 according to embodiments of the present disclosure. An embodiment of the CRS RE mapping 700 shown in FIG. 7 is for illustration only. Other embodiments may be used without departing from the scope of the present disclosure.

To assist cell search and synchronization, DL signals include synchronization signals such as a primary synchronization signal (PSS) and a secondary synchronization signal (SSS). Although having the same structure, the time-domain positions of the synchronization signals within a sub-frame 710 that includes at least one slot 720 differs depending on whether a cell is operating in frequency division duplex (FDD) or time division duplex (TDD). Therefore, after acquiring the synchronization signals, a UE determines whether a cell operates on the FDD or on the TDD, and a subframe index within a frame. The PSS and SSS occupy the central 72 sub-carriers, also referred to as resource elements (REs) 750, of an operating bandwidth. Additionally, the PSS and SSS inform of a physical cell identifier (PCID) for a cell and therefore, after acquiring the PSS and SSS, a UE knows the PCID of the transmitting cell.

Figure 8:
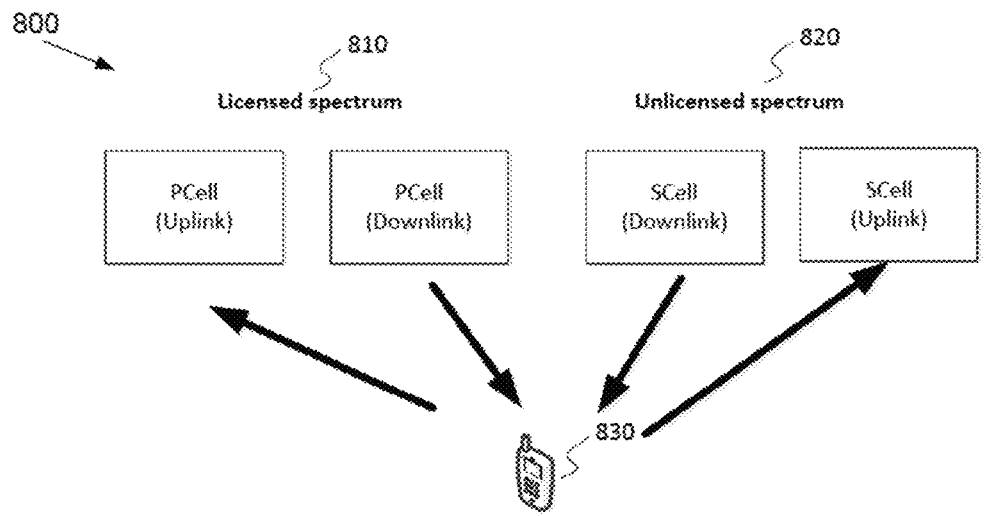
FIG. 8 illustrates an example carrier aggregation scheme on licensed and unlicensed spectrum according to embodiments of the present disclosure.

FIG. 8 illustrates an example carrier aggregation scheme on licensed and unlicensed spectrum 800 according to embodiments of the present disclosure. An embodiment of the carrier aggregation on licensed and unlicensed spectrum 800 shown in FIG. 8 is for illustration only. Other embodiments may be used without departing from the scope of the present disclosure.

A possible deployment scenario for LAA is to deploy an LAA carrier as a part of a carrier aggregation scheme, where the LAA carrier is aggregated with another carrier(s) on a licensed spectrum as illustrated in FIG. 8. In a conventional scheme, carrier(s) on the licensed spectrum 810 is assigned as a PCell and carrier(s) on the unlicensed spectrum 820 is assigned as a SCell for a UE 830. FIG. 8 shows an example where the LAA cell comprises of a downlink carrier with an uplink carrier. Since there may be other RATs operating on the same unlicensed frequency spectrum as the LAA carrier, there is a need to enable co-existence of other RAT with the LAA on an unlicensed frequency spectrum. A carrier sense multiple access (CSMA) may be applied, for example before a UE or an eNB transmits. In the CSMA operation, the UE or the eNB monitors a channel for a predetermined time period to determine whether there is an ongoing transmission in a channel. If no other transmission is sensed in the channel, the UE or the eNB may transmit data. If there is other transmission in the channel, the UE or the eNB postpones a transmission. Hereafter, the term LAA device may refer to an eNB or a UE operating on an LAA carrier.

Figure 9:
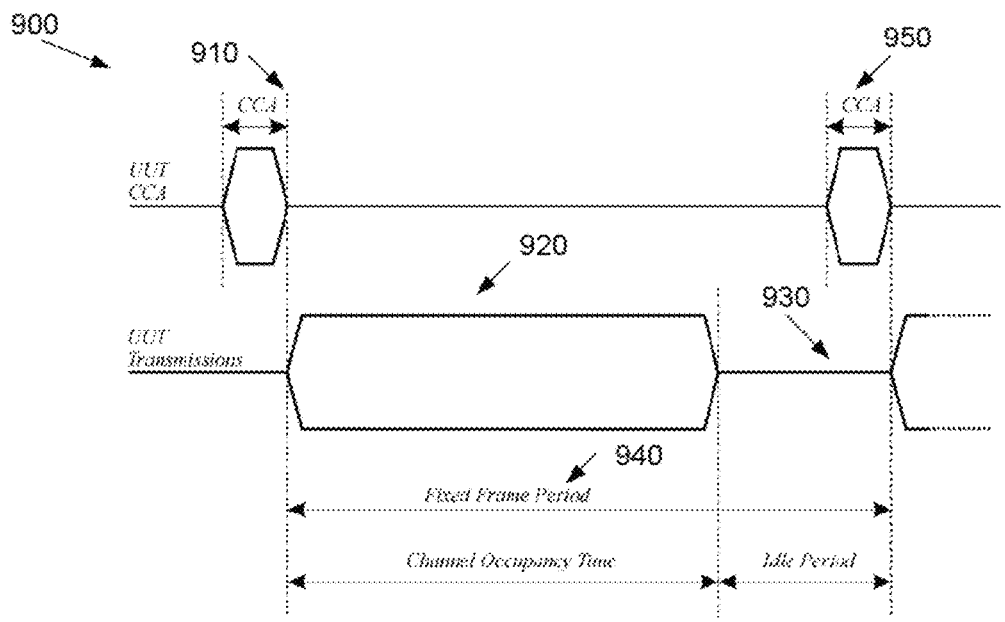
FIG. 9 illustrates an example timing alignment for a frame-based equipment (FBE) according to embodiments of the present disclosure.

FIG. 9 illustrates an example timing alignment for a frame-based equipment (FBE) 900 according to embodiments of the present disclosure. An embodiment of the timing alignment for the frame-based equipment (FBE) 900 shown in FIG. 9 is for illustration only. Other embodiments may be used without departing from the scope of the present disclosure.

As illustrated in FIG. 9, before an LAA device starts a transmission on a channel (or carrier), the LAA device performs a clear channel assessment (CCA) check 910 for a duration that is no less than 20 micro second (μs) (such as using energy detection). If the LAA device considers that the channel/carrier has been occupied, for example a channel energy level exceeds a threshold, the LAA device does not transmit data for a next FFP 940. In one example, if the LAA device considers that the channel/carrier is clear or idle, the LAA device transmits immediately with a total transmission duration in the range 1 ms to 10 ms 920. After the end of channel occupancy time, there may be a minimum idle period (such as 5%) of a channel occupancy time 930. Towards the end of the idle period, the LAA device may perform another CCA check 950.

Note that the embodiments described in the present disclosure are not limited to operation on unlicensed spectrum, but also on lightly licensed spectrum, licensed shared spectrum and the like.

In some embodiments, multiple transmission points that can be geographically separated and operating on unlicensed spectrum can be connected to an eNodeB. The transmission points (TPs) can be operating on the same carrier frequency or different carrier frequencies on unlicensed spectrum. The TPs may be assigned with the same physical cell identity or different physical cell identities (PCIs) (in which case a TP is also considered a cell).

In such embodiments of coordinated transmission architecture, at least a medium access controller (MAC) scheduler (and other higher layer functionalities) can reside at a central node/location (such as network entity (NE)) and at least physical layer functionalities can reside at each TP. A listen-before-talk (LBT) operation can be carried out locally and independently for each TP based on local observation of interference/energy. In one example, an LBT module that is responsible for LBT functionalities, for example a control logic required for implementing the LBT procedure (e.g. as a finite state machine (FSM) with states such as 'IDLE', 'TRANSMIT', 'CONTEND') and physical layer functionalities required for CCA and channel reservation can be specified and located at each TP. In such example, an LBT module can be an interface between a MAC layer and physical layer.

In another example, the LBT module (or part thereof) can be considered to be a part of the MAC layer. In yet another example, the LBT module (or part thereof) can also be embedded within a physical layer module. In such example, independent LBT decision (e.g. state outcome from the FSM) is determined at each TP and is sent to an NE (such as centralized node/processing unit). In yet another example, an LBT control logic can be specified and located at the NE, where there is one LBT control logic for each TP; while the physical layer functionalities required for LBT can be located at each TP. In such example, the LBT decision is determined at the NE based on physical layer outputs such as interference measurement from CCA slots and the LBT decision is sent to each TP to control the physical layer behavior of each TP such as performing measurement or transmission. Regardless of the location(s) of the LBT functionalities in a network, it is assumed hereafter that the LBT operation can be carried out locally and independently for each TP.

Figure 10:
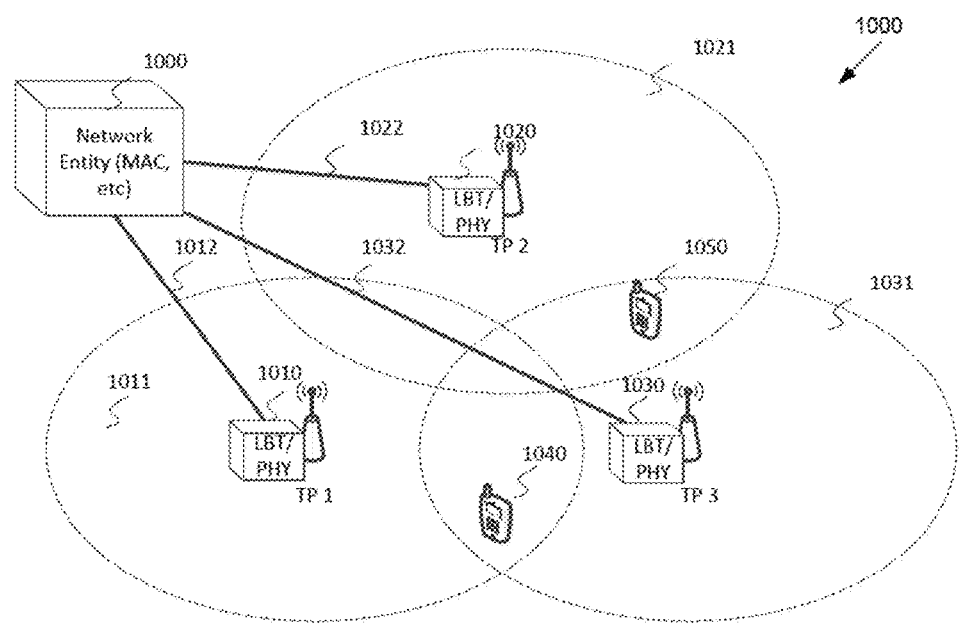
FIG. 10 illustrates an example architecture of a coordinated transmission on unlicensed spectrum according to embodiments of the present disclosure.

FIG. 10 illustrates an example architecture of a coordinated transmission 1000 on unlicensed spectrum according to embodiments of the present disclosure. An embodiment of the architecture of a coordinated transmission 1000 on unlicensed spectrum shown in FIG. 10 is for illustration only. Other embodiments can be used without departing from the scope of the present disclosure.

As shown in FIG. 10, the architecture of the coordinated transmission 1000 comprises a plurality of eNodeBs (such as TPs) 1010, 1020, 1030, a plurality of networks 1011, 1021, 1031, a plurality of UEs 1040, 1050, and a network entity (NE) (such as central processing unit, for example MAC) 1060. More specifically, an LBT and physical layer operations are performed locally and independently for each TP 1010, 1020, 1030, and higher layer functionalities are performed at the NE 1060 interconnected with the TPs 1010, 1020, 1030 with backhaul connections 1012, 1022, 1032, which can be fibers or over-the-air interface such as millimeter wave. In one embodiment, the coordinated transmission 1000 can be suited for a cloud/centralized RAN (C-RAN) network architecture.

In some embodiments, depending on interference observed at each TP (such as local interference), the TP may transmit signals or defer signal transmission according to an LBT procedure. For a single TP, a transmission can be delayed due to detection of another device (e.g. a neighboring TP or a node of another LTE network on unlicensed spectrum or a device of another RAT) transmitting on an operating channel. Even if a TP is able to observe that another TP transmitting belongs to the same network and hence may be considered "friendly" interference in the sense that transmission from the observer TP may not harm or be harmed by the other TP, it still may not be appropriate for the observer TP to transmit when the other TP is transmitting since the observer TP may not be able to determine accurately or reliably that another node that may belong to another network or RAT is also transmitting at the same time as its transmission could be masked by the transmission of the other TP of the same network. In general, transmission opportunity of a TP decreases with increasing interference or transmission activity level from neighboring nodes/devices. Therefore, there is a need to increase or minimize decrease of transmission opportunity from the network to a UE due to the increasing interference or transmission activity level from neighboring nodes/devices.

In order to increase transmission opportunity from a network to a UE, the UE can be configured to receive from multiple TPs of the network. Suppose the UE is configured to receive from two TPs. When the two TPs are operating on different carrier frequencies on unlicensed spectrum, the UE operates in carrier aggregation of at least two carriers, by receiving signals from two the carriers, possibly simultaneously. When the two TPs are operating on the same carrier frequency on unlicensed spectrum, the UE can receive signals from the two TPs on the same carrier frequency in a coordinated multiple point transmission mode (CoMP), for example, by being configured in transmission mode 10 or other transmission mode that is able to facilitate coordinated multi-point operation. In addition, the UE may receive signals from co-channel TPs simultaneously if joint transmission is performed by the co-channel TPs. In one example, the UE may receive only from one of the co-channel TPs at a given time if dynamic point selection is performed by the co-channel TPs.

In one embodiment, a set of TPs selected for a UE can depend on traditional channel quality metrics such as reference signal received power (RSRP), reference signal received quality (RSRQ) or reference signal strength indicator (RSSI), and also on a channel access rate that is a measure of the probability that the TP is able to pass CCA and gain access to a channel. In one example, the channel access rate is defined to be the ratio of total number of idle CCA slots over the total number of CCA slots. In another example, the channel access rate is defined to be the ratio of total number of ACKs over the total number of ACK-NACKs used to adapt the contention window size. In yet another example, the channel access rate is defined to an average of time duration from time with intent to contend for channel (e.g. time when random counter value is drawn) to the time when contention is successful. The channel access rate metric used for TP selection is based on long term measurement (e.g. in the order of 100 s of milliseconds or longer). A set of TPs selected for a UE can also depend on a load of the TPs, such as buffer occupancy, an amount of data stored that are to be transmitted by the TPs. A set of TPs selected for a UE can also depend on ae number of nodes of other RAT operating nearby (and their activity levels), such as Wi-Fi APs and STAs, which can be either measured by the TPs or can be measured and reported by the UEs.

Figure 11:
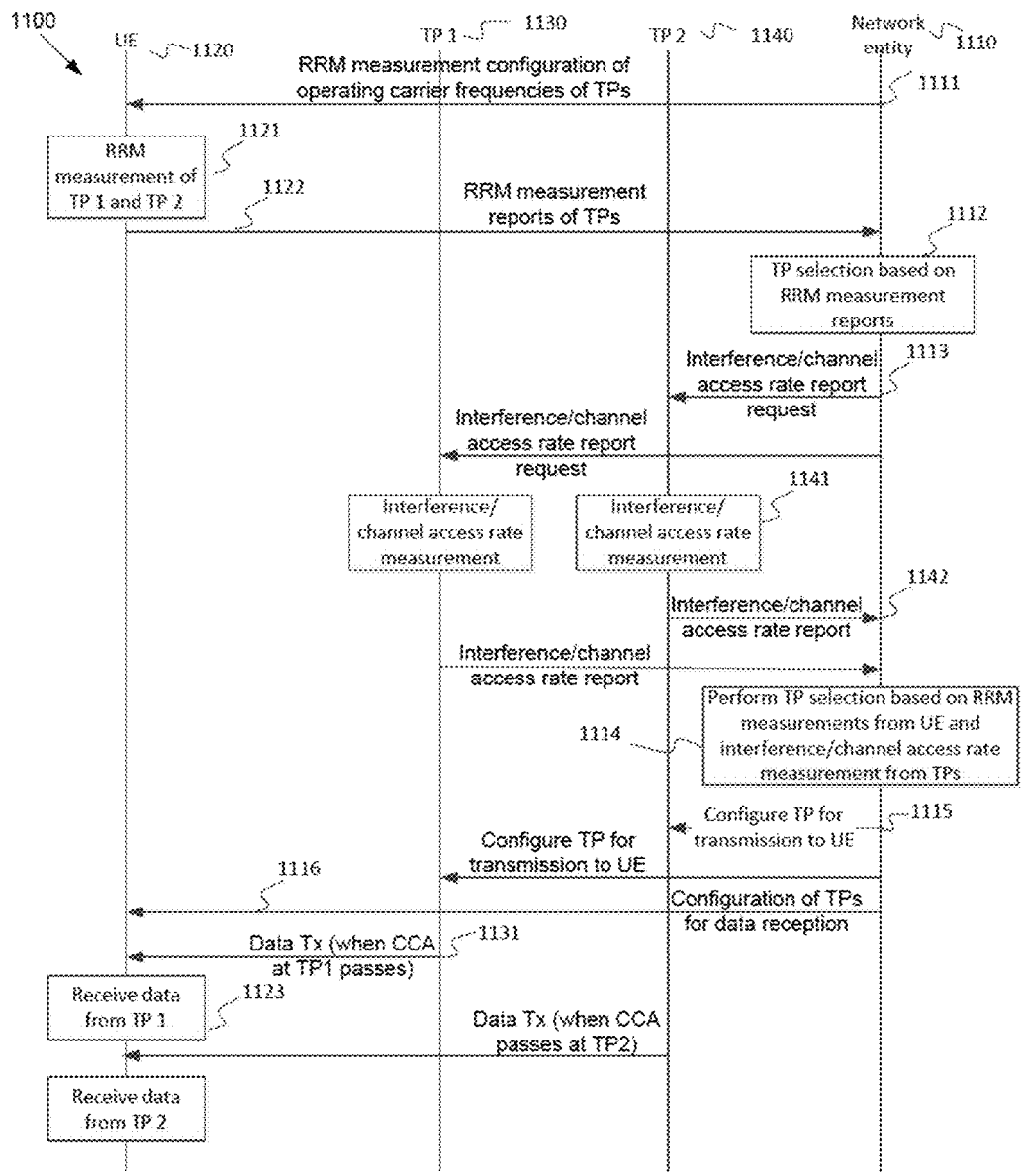
FIG. 11 illustrates a flowchart of transmission point (TP) selection method according to embodiments of the present disclosure.

FIG. 11 illustrates a flowchart of transmission point (TP) selection method 1000 according to embodiments of the present disclosure. An embodiment of the flowchart of transmission point (TP) selection method 1100 shown in FIG. 11 is for illustration only. Other embodiments can be used without departing from the scope of the present disclosure.

As shown in FIG. 11, the transmission point selection method 1100 comprises a network entity (such as eNB) 1110, a UE 1120, a plurality of TPs 1130, 1140. As shown in FIG. 11, an eNodeB 1110 (such as a network entity (NE)) can configure a UE 1120 to measure and report RSRP or RSRQ or other radio resource management (RRM) measurement such as a received signal strength indicator (RSSI) 1111 of a network configured or the UE detected set of TPs 1130, 1140.

In one embodiment, based on at least a UE's RRM measurement 1121 and report 1122, the NE 1110 can then select a subset of TPs with suitable channel quality (such as RSRP/RSRQ>a threshold or RSSI<a threshold) 1112 and instruct the TPs 1130, 1140 to measure and report interference (such as RSSI observed at TP) or channel access rate (such as probability of CCA slot is idle) observed on the eNB's operating channel if not already available 1113.

Based on at least a TP's measurement 1141 and report 1142, the NE 1110 can further down-select a subset of TPs 1114 with satisfactory load condition and/or presence of nodes from other RAT and/or channel access rate (such as probability of CCA slot is idle is more than a certain value, and aforementioned other metrics) or interference level to be configured to the TPs 1130, 1140 (such as configure TP for transmission to UE) 1115 and to the UE 1120 (such as configuration of TPs for data reception 1116). The TP configuration 1116 to the UE 1120 can be achieved using a carrier from a licensed band or through one of the TPs 1130, 1140 if currently configured to the UE 1020. The selected subset of TPs 1130, 1140 can then transmit signals 1131 to be received by the UE 1020 (such as 1023). The NE 1110 can also reselect the TPs 1130, 1140 when there is a change in the channel quality or the channel access rate, and reconfigure the TPs 1130, 1140 selected to the TPs 1130, 1140 and to the UE 1120.

In one embodiment, a TP selection is performed based on TP's measurement first before a UE RRM measurement, for example, the TP selection processes of 1112 and 1114, as well as the corresponding configuration signaling to enable the processes are reversed.

In another embodiment, a TP selection process based on UE RRM measurement and TP measurement occurs jointly. While the transmission point selection method 1100 as shown in FIG. 11 depicts a series of sequential steps or signals, unless explicitly stated, no inference should be drawn from that sequence regarding specific order of performance, performance of steps and signals or portions thereof serially rather than concurrently or in an overlapping manner, or performance of the steps depicted exclusively without the occurrence of intervening or intermediate steps. In such embodiments, the set of TPs that can be selected to be configured for a UE can also require that the TPs are within the listening range of each other. The set of TPs configured for the UE can be beneficial if the set of TPs are coordinating to perform a dynamic point selection (DPS) scheme, whereby only one TP is transmitting to the UE at a time.

When the set of TPs are within the listening range of each other and when the set of TPs are backing off to each other's transmission, it is with a high probability that only one of the set of TPs can gain access to the channel at a given time and transmit to the UE, or that the UE only receives from one of the set of TPs at a given time. In this way, the UE can be configured to operate in a transmission mode which is the same or similar to transmission mode 10 (such as described in LTE specification). To this end, inter-TP listening criterion can be established among the set of TPs to determine candidates of coordinating TPs. The other measurement metrics aforementioned can then be used to down select an actual set of coordinating TPs for each UE. For example, a TP can listen to transmission from the other TPs (such as a discovery signal transmission) and report to a central node the TPs that the TP can hear and at what signal level. Alternatively, a signal level threshold can be set or configured by the central node to the TPs such that TPs with signal levels higher than the set threshold are reported to the central node. Based on the information reported by each TP, the central node can then establish coordinating TP sets according to an inter-TP listening criterion.

When configured to receive a transmission from multiple TPs (such as transmission mode 10), a UE generally may not assume quasi co-location of transmission ports (including demodulation-reference signal (DM-RS), channel state information-reference signal (CSI-RS), common reference signal (CRS) ports) among the multiple TPs. In one embodiment, the set of quasi co-located ports can be signaled by a network similar to the transmission mode 10. In another embodiment, a UE may assume that the transmission ports used within the same transmission burst are quasi co-located, but may not assume that the transmission ports used for different transmission burst are quasi co-located. In yet another embodiment, a UE may assume that the transmission ports used for different transmission bursts are quasi co-located if the reference ports for quasi co-location assumption (such as assumed transmitted along with the burst) is indicated or detected to be the same, for example if a CRS or CSI-RS port is used as the reference for quasi co-location assumption, the UE assumes the transmission ports used for different transmission bursts are quasi co-located if the scrambling id that may be the PCI for CRS port that scrambles the CRS or CSI-RS sequence corresponding to the bursts is the same, otherwise the UE may not assume the transmission ports for different transmission bursts are quasi co-located. In some embodiments, a UE can be configured to measure and report a CSI of a set of coordinating TPs to enable efficient link adaptation.

In some embodiments, there are different possible MAC scheduling methods of transport blocks (TBs) to a UE. In one embodiment, an IP packet addressed to the UE can be divided into multiple medium access control protocol data units (MAC PDUs) or transport blocks. A MAC scheduler can first assign to each TP configured to the UE a non-overlapping set of transport blocks. An amount of TBs assigned to each TP (including zero TB or zero data) can depend on the latest channel state information and/or channel access condition and/or load condition and/or buffer occupancy status and/or received interference condition and/or activity of neighboring nodes (e.g. Wi-Fi APs or STAs) as measured by the TP or reported by the UEs, such as larger TBs or larger number of TBs can be assigned to a TP with more favorable channel condition (e.g. higher channel quality indicator (CQI), higher RSRP, higher RSRQ) and/or more favorable channel access condition (e.g. larger ratio of idle CCA slots over the total number of CCA slots), and/or lower load condition (e.g. lower TP buffer occupancy, lower number of serving UEs, lower number of operating neighbor TPs, lower number of operating neighbor inter-RAT nodes such as Wi-Fi APs and STAs), and/or lower received interference condition (e.g. lower RSSI, lower interference/energy level from neighboring nodes). TP that does not receive a TB is not considered "activated" for coordinated transmission. In one example, compared to the metrics used for TP selection, the metrics used here is based on more short term measurement (e.g. less than 100 ms). Each TP then attempts to deliver the assigned TBs to the UE. An eNodeB can dynamically adjust loads of TPs by sending more data to TPs that are more efficient in delivering the TBs to the UEs (such as based on acknowledge/negative acknowledges (ACK/NACKs) reported by the UE over a time period and a user perceived throughput).

Figure 12:
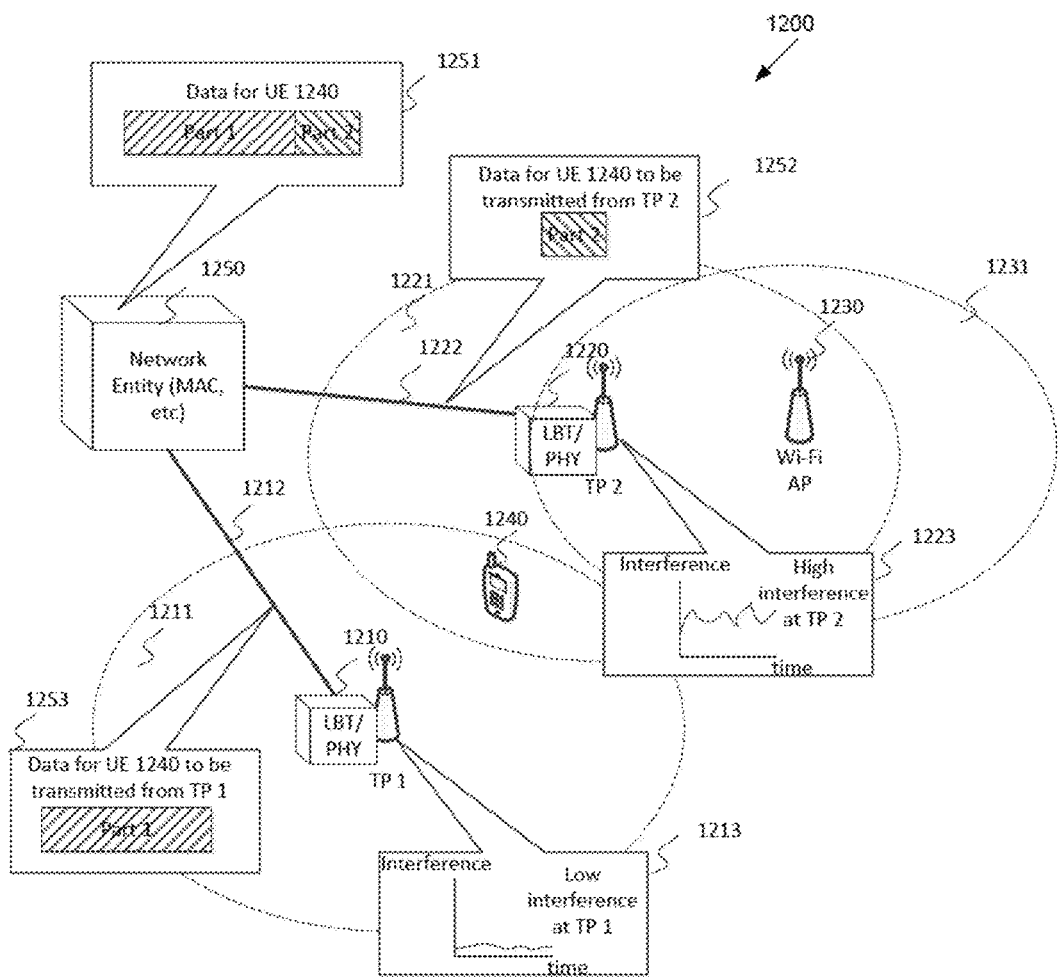
FIG. 12 illustrates an example architecture of load distribution on interference level observed at each TP according to embodiments of the present disclosure.

FIG. 12 illustrates an example architecture of load distribution 1200 on interference level observed at each TP according to embodiments of the present disclosure. An embodiment of the architecture of load distribution 1200 on interference level observed at each TP shown in FIG. 12 is for illustration only. Other embodiments can be used without departing from the scope of the present disclosure.

As shown in FIG. 12, the architecture of the load distribution 1200 comprises a plurality of TPs 1210, 1220, 1230, a plurality of networks 1211, 1221, 1231, a UE 1240, and a network entity (NE) (such as MAC) 1250. More specifically, an LBT and physical layer operations are performed locally and independently for each TP 1210 (such as TP 1), 1220 (such as TP 2), 1230, and higher layer functionalities are performed at the NE 1250 interconnected with the TPs 1210, 1220, 1230 with backhaul connections 1211, 1222. As shown in FIG. 12, data distribution for the UE 1240 to multiple TPs 1210, 1220 based on the level of interference/channel access condition is observed at each TP 1 1210 and TP 2 1220.

The TP 1 1210 and TP 2 1220 are configured for the UE 1240. TP 1 1210 is relatively free from interference while TP 2 1220 is interfered by a Wi-Fi AP 1230 on the same operating frequency. The NE 1250 receives a data packet for the UE 1240, and partition the data block into two unequal parts where the larger part (such as part 1) 1253 is assigned to TP 1 1210 for transmission to the UE 1240 and the smaller part (such as part 2) 1252 is assigned to TP 2 1220 for transmission to the UE 1240. Note that TP 1 1210 and TP 2 1220 may operate on the same carrier frequency or different carrier frequency.

Suppose the TPs 1210, 1220 are operating on the same carrier frequency and different data is transmitted from the TPs 1210, 1220. If transmissions from multiple TPs happen to occur at the same time (such as on the same subframe), it is advantageous from a throughput perspective for the UE to receive assignments from the TPs 1210, 1220 at the same time. In one embodiment, for simplicity, the UE 1240 may select only one (or a subset) of the assignments to be received, for example a TP with the strongest signal strength (such as largest RSRP/CSI-RSRP), or the largest TBs to maximize throughput. In one embodiment, TPs that are operating on the same carrier frequency can be transmitting at the same time if the TPs do not hear each other (such as signal not detected or signal level is below CCA threshold) or if the TPs are performing frequency reuse-1 transmissions. When the coordinating TPs can hear each other and are backing off from each other's transmission (such as CCA does not differentiate energy from coordinating or non-coordinating TPs), the TPs do not transmit at the same time (with high probability) and a DPS scheme (such as transmission mode 10 or similar as described in LTE specification) can be realized whereby the UE only receives data transmission from one TP at a given time.

In another embodiment, an NE can also assign the same set of transport blocks (such as same data) to multiple TPs 1210, 1220 for transmissions. Each TP (such as TP 1 and TP 2) then attempts to deliver assigned TBs to the UE 1240. Depending on a channel condition of each TP (such as TP 1 and TP 2), the UE 1240 may receive one or multiple copies of the same TB from multiple TPs 1210, 1230. This scheduling strategy can be beneficial for delivering packet that is latency sensitive (such as a VoIP packet). To reduce an overhead of transmitting a TB that is already successfully received by the UE 1240 from another TP, once a TB is transmitted successfully by one of the TPs 1210, 1220 (such as ACK received by the NE), the TPs 1210, 1220 can send a control signal over backhaul to instruct removal the same TB from the transmission queue of the other TPs.

Figure 13:
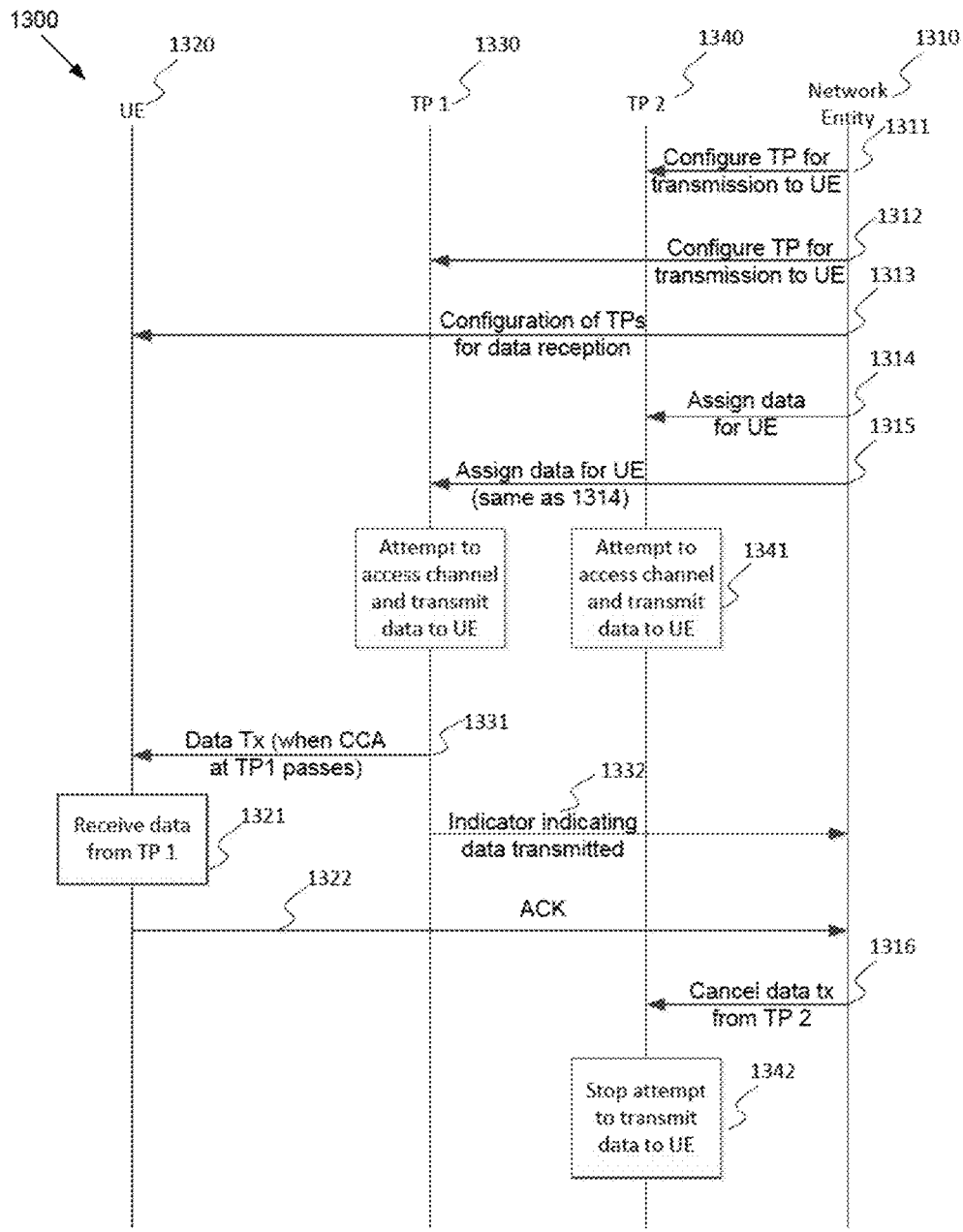
FIG. 13 illustrates a flowchart of scheduling method of the same data from multiple TPs according to embodiments of the present disclosure.

FIG. 13 illustrates a flowchart of scheduling method 1300 of the same data from multiple TPs according to embodiments of the present disclosure. An embodiment of the architecture of load distribution 1300 on interference level observed at each TP shown in FIG. 13 is for illustration only.

Other embodiments can be used without departing from the scope of the present disclosure.

As shown in FIG. 13, the scheduling method 130 comprises an NE 1310, a UE 1320, a plurality of TPs 1330, 1340 (such as TP 1 1330 and TP 2 1340). In one example, after the TP configuration setup indications 1311, 1312, 1313, the NE 1310 (such as an eNB) assigns the same data 1314, 1315 to the TP 1 1330 and TP 2 1340 to be transmitted for a UE 1320. The TPs 1330, 1340 then attempt to access their operating channel and transmit the data to the UE 1220. One of the TPs 1330, 1340 may be successful in gaining access to the channel first and transmit to the UE 1220. In such example, the TP 1 1310 can send an indicator to the NE 1310 that the data has been transmitted 1332. The indicator can be sent after TP 1 has gained access to the channel or has started transmission. This method has advantage over another scheme where the indicator is sent after the transmission has been completed as it provides maximum time for the NE to prepare to receive any response as a result of the DL transmission, such as HARQ-ACK if the DL transmission is DL unicast data (PDSCH) or UL data transmission (PUSCH) if the DL transmission is an UL grant. Meanwhile, the UE 1320 receives and decodes the data from TP 1 1321 and sends an HARQ-ACK (ACK if the data is successfully received 1322; a NACK otherwise). The NE 1310 upon reception of the ACK by the UE 1320, can send a command to cancel transmission of the data successfully received by the UE 1320 to TP 2 1340 using a signal 1316. TP 2 1340 can then stop the TP 2's attempt to transmit data to the UE 1342 at the block 1342. If the NE 1310 receives a NACK from the UE 1320, the NE 1310 can let TP 2 1340 continue the TP 1340's attempt to transmit data to the UE 1320.

In another embodiment, the NE 1310 just waits for an indicator from the TP 1 1330 and does not wait for an ACK from the UE 1320 to reduce delay to send a command to cancel transmission to the TP 2 1340. Note that TP 1 1330 and TP 2 1340 may operate on the same carrier frequency or different carrier frequency. While the chart depicts a series of sequential steps or signals, unless explicitly stated, no inference should be drawn from that sequence regarding specific order of performance, performance of steps and signals or portions thereof serially rather than concurrently or in an overlapping manner, or performance of the steps depicted exclusively without the occurrence of intervening or intermediate steps.

In another embodiment, if the TPs 1330, 1340 are operating on the same carrier frequency and the same data is transmitted from the TPs 1330, 1340, the NE 1310 can assign a set of physical resource blocks for transmissions from the TPs 1330, 1340 if the TPs 1330, 1340 share the same PCI. In such embodiment, if the transmissions from multiple TPs 1330, 1340 happen to occur at the same time (such as on the same subframe), a signal can be combined over the air for a UE reception. In case the same transport block is transmitted by the TPs 1330, 1340 in the same subframe but in different physical resource blocks, a UE 1320 may not receive the assignments from the TPs 1330, 1340 at the same time. In one example, the UE 1320 may choose only one assignment to receive. In case the same transport block is received or decoded by the UE 1320 from the multiple TPs 1330, 1340, a redundant transport block can be removed when they are reassembled for a higher layer processing.

Physical layer retransmissions of a TB from one or multiple TPs are important features to be supported by an LAA to improve LTE spectral efficiency. However, the legacy hybrid automatic repeat-request (HARQ) procedure may be interrupted by discontinuous nature of LAA transmissions due to LBT constraints. For example, TP 1 1330 may send a TB for a UE 1320 in a first time slot and the UE 1320 is unable to correctly decode the TB and indicates this to the TP 1 1330 with a NACK message. The TP 1 1330 may prepare a retransmission of the TB, but at the second time slot, the CCA procedure may indicate a channel is occupied and TP 1 1330 is unable to transmit. As a result the TP 1 1330 may wait for next available time slots when the CCA procedure indicates the channel is available, however an unknown latency to the HARQ procedure for the TB may be introduced.

In one embodiment, when a HARQ retransmission is unable to be transmitted by a first TP, the HARQ procedure may be continued by a second TP that is able to transmit the TB. In order to support the continuation of the procedure, depending on the network architecture between one or more candidate serving TPs, the first TP may utilize one or a combination of the information (such For example, a NACK message, a HARQ process ID, an RV index, a CCA threshold or CCA pass/fail indication, a backoff counter, and Data for retransmission if not already buffered at another TP or coordinating entity) as to indicate the suspension, for each TB, of the HARQ procedure at the first TP).

The signaling of the information may be contained in separate or a combined signaling message and exchanged between one or more TPs or scheduling coordinating entities. For example, a scheduling coordinating entity may utilize HARQ process and RV IDs to inform a second TP of the appropriate HARQ process to continue and which RV may be utilized for the retransmission at the second TP. If the RV ID is not present, it may be assumed that the RV is fixed by the TPs (such as RV0 is always assumed, for example in case of a chase combining). In addition, CCA information may be an implicit indication to a network of suspension of the HARQ procedure at the first TP if an entity knows the current HARQ process and RV ID(s) being utilized by the first TP. Backoff counter information may be additionally used by the coordinating entity or other TPs to determine which TP is most likely to have access the channel next or within a given time window, and the HARQ procedure may be continued at another TP if an access probability is greater.

In another embodiment, when a HARQ retransmission is unable to be transmitted by a first TP, a HARQ procedure may be terminated by the first TP and a second TP that is able to transmit, and transmits a TB based on a radio link control (RLC) retransmission of the data packet instead. This method is beneficial to reduce a complexity of handling HARQ procedure suspension and continuation across multiple carriers or TPs since an upper-layer management (such as RLC layer) can be indicated to provide a retransmission of the entire RLC packet to lower layers resulting in a new HARQ process for the TB at the same or different TP.

The same signaling methods and messages may be used to support the aforementioned embodiments above with the exception that the HARQ management entity (such as centralized or at a given TP) may not continue the HARQ process, but pass a HARQ termination signaling to an RLC layer to trigger the RLC retransmission of the data. When the RLC retransmission is passed to the lower layers, the subsequent HARQ process management and TB transmission are handled instead by the second TP.

In one example, if the RLC retransmission management is handled by multiple TPs individually, the TP may instead of forwarding NACK/HARQ/RV information, provide a RLC retransmission index (such as data packet) to other TPs or coordinating entity to trigger continuation of the data transmission at another TP at the RLC layer.

In one example, embodiments of the present disclosure can be applied to a network deployment with non-ideal backhaul (such as 10 s or 100 s of milliseconds one-way latency) inter-connecting the TPs or connected to an NE. In such example, locations of functionalities can be rearranged depending on the backhaul latency. For example, a MAC layer or higher layer functionalities than the MAC layer can be located at the TPs, and a load distribution to TPs can be achieved at the higher layer than the MAC layer (such as after the packet data convergence protocol (PDCP) layer).

In some embodiments, a multimedia broadcast multicast service single frequency network (MBSFN) configuration of SCell can be configured by RRC configuration. In one example, up to 6 subframes per frame can be configured to be MBSFN subframes. The MBSFN subframes can be configured for physical downlink shared channel (PDSCH) or physical multicast channel (PMCH) transmissions. UEs configured with DM-RS based transmission modes can be scheduled in any subframe not reserved for PMCH, while UEs configured with CRS based transmission modes can be scheduled in non-MBSFN subframes. The network can configure the number of MBSFN subframes for a LAA SCell according to population of served UE types/categories and their traffics. Adaptation to changing traffics and UE population can be performed via RRC reconfiguration of MBSFN subframes. A network scheduler can take into account the upcoming subframe type while contending for channel access, such that compatible UEs can be scheduled after gaining channel access.

For LAA, a UE attempts to detect and receive LAA DRS according to DRS measurement timing configuration (DMTC) configuration by a network. The LAA DRS can be transmitted by the network in any subframe within the DMTC window (such as 6 ms duration). The LAA DRS can consist of 12 OFDM symbols duration with primary synchronization signal (PSS) and secondary synchronization signal (SSS) mapped to a resource grid of a subframe according to frame structure, and with CRS (such as port 0 only or port 0, 1, . . . N, where N is the total number of CRS ports supported by the base station) mapped to the same resource grid according to non-MBSFN subframe structure (such as for port 0 and 1, CRS are mapped to 4 OFDM symbols). In addition, CSI-RS can also be configured to map to DRS subframe.

In one example of the LAA DRS transmission, a higher-layer indicated MBSFN subframe may assume a non-MBSFN subframe structure if DRS is transmitted in the same subframe. In such example, the LAA DRS transmission can occur during DMTC windows and a UE can identify such subframe (such as via DRS detection or via control signaling). There is a need to specify if UEs configured with one of the CRS based transmission modes can be scheduled in DL in such a subframe.

In one example, UEs configured with one of the CRS based transmission modes (such as Mode 1, 2, 3, 4, 5, 6 in LTE specification) do not expect to be scheduled by the network in DL in such a subframe. In other words, the UE is not expected to receive PDSCH in such a subframe.

In another example, UEs configured with one of the CRS based transmission modes can be scheduled by a network in DL in such a subframe. In other words, the UEs can receive PDSCH in such a subframe. The advantage of this approach is that resource waste can be minimized. Since the occurrence of such subframe is dynamic and can be random, there is a need for the UE to identify such subframe to determine if the subframe can be scheduled to receive PDSCH.

In yet another example, UEs configured with CRS based transmission modes can blindly detect the presence of DRS in a higher-layer indicated MBSFN subframe. If DRS is determined to be present, the UEs can assume that the UE may be scheduled to receive PDSCH and the UEs attempts to detect DCI format for DL assignment; otherwise the UEs can assume that the UEs would not be scheduled to received PDSCH and the UEs does not attempt to detect DCI format for DL assignment. The UEs may perform this function during the DMTC windows since DRS is not expected by the UEs to be transmitted outside of the DMTC windows.

In yet another example, a control signaling is used to indicate to a UE the presence of DRS in a subframe. The control signaling can be dynamically and commonly signaled (such as common DCI or UE-specific signaling). If the UE is indicated the presence of DRS in a higher-layer indicated MBSFN subframe, the UE can assume that the UE may be scheduled to receive PDSCH and the UE attempts to detect DCI format for DL assignment; otherwise, the UE can assume that the UE would not be scheduled to receive PDSCH and the UE does not attempt to detect DCI format for DL assignment.

In some embodiments, UEs can be configured with one of the DM-RS based transmission modes (such as Mode 7, 8, 9, 10 in LTE specification) but can receive PDSCH with a CRS-based transmission scheme (such as CRS port 0 and transmit diversity with CRS port 0 and 1 or CRS port 0 to 3). The UE configured with one of the DM-RS based transmission modes can receive PDSCH with a CRS-based transmission scheme if the DCI format indicating the DL assignment is DCI format 1A (or other DCI format capable of scheduling CRS-based PDSCH). In one example, if DRS is determined to be present, the UE can assume that the UE may be scheduled to receive PDSCH assigned using DCI format 1A and the UE attempts to detect DCI format 1A for DL assignment; otherwise the UE can assume that the UE would not be scheduled to receive PDSCH assigned using DCI format 1A and the UE does not attempt to detect DCI format 1A for DL assignment.

In some embodiments, UEs can be configured with PDSCH transmissions relying on CRS as the demodulation reference such as PDSCH configured by temporary cell radio network temporary identifier (C-RNTI), random access-RNTI (RA-RNTI), paging-RNTI (P-RNTI) or system information-RNTI (SI-RNTI).

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A network entity (NE) comprising:
  a communication interface configured to receive feedback information from multiple transmit points (TPs) operating in a cell providing license assisted access (LAA); and
  at least one processor configured to:
    process the feedback information received from the multiple TPs;
    select the multiple TPs that perform a coordinated transmission to a user equipment (UE) based on the feedback information received from the multiple TPs, wherein the feedback information comprises information associated with a channel access rate that is a measure of a probability that the multiple TPs are able to pass clear channel assessment (CCA) and gain access to a channel, and wherein the channel access rate is a ratio of a total number of idle CCA slots over a total number of CCA slots;

generate scheduling information for a coordinated transmission by the multiple TPs to the UE using the LAA in accordance with the feedback information; and wherein the communication interface is further configured to transmit the scheduling information to the multiple TPs.

2. The NE of claim 1, wherein the at least one processor is further configured to:

segment a data packet into a plurality of transport blocks (TBs) in accordance with the feedback information received from the multiple TPs; and schedule a number of the TBs to be transmitted to the UE through the multiple TPs.

3. The NE of claim 2, wherein segmentation of the data packet further comprises segment the data packet with the same TB size.

4. The NE of claim 2, wherein segmentation of the data packet further comprises segment the data packet with different TB sizes.

5. The NE of claim 1, wherein the feedback information comprises at least one of a channel access rate information that is determined based on a listen before talk (LBT) protocol and channel state information received from the UE through the multiple TPs.

6. The NE of claim 5, wherein the feedback information further comprises inter-TP coordinated information determined by an inter-TP coordinated scheme between the multiple TPs.

7. The NE of claim 1, wherein the scheduling information includes TP selection information.

8. A first transmit point (TP) operating in a first cell providing licensed assisted access (LAA) comprising:

at least one processor configured to:
establish a connection with a second TP operating in a second cell providing license assisted access (LAA) to perform a coordinated transmission to a user equipment (UE); and
generate inter-TP coordinated information in accordance with an inter-TP coordinated scheme between the first and second TPs;
process feedback information received from the UE;

a communication interface configured to:
transmit the feedback information to a network entity (NE); and
receive scheduling information from the NE based on the feedback information, the scheduling information providing for an inter-TP coordinated transmission by the first and the second TPs to the user equipment (UE) in accordance with the feedback information from the first cell and the second cell using the LAA; and wherein the first and the second TPs have been selected by the NE to perform a coordinated transmission to the UE based on the feedback information from the first and second TPs, wherein the feedback information comprises information associated with a channel access rate that is a measure of a probability that the first and second TPs are able to pass clear channel assessment (CCA) and gain access to a channel, and wherein the channel access rate is a ratio of a total number of idle CCA slots over a total number of CCA slots.

9. The first TP of claim 8, wherein the scheduling information includes TP-selection information.

10. The first TP of claim 8, wherein the communication interface is further configured to:

receive a data packet that is segmented into a plurality of transport blocks (TBs) from the NE, the plurality of TBs being segmented in accordance with the feedback information; and transmit the plurality of TBs to the UE in accordance with the scheduling information received from the NE.

11. The first TP of claim 10, wherein the communication interface is further configured to retransmit the plurality of TBs to the UE in accordance with a radio link control protocol when the first TP is unable to re-transmit a hybrid automatic repeat and request (H-ARQ) data packet to the UE.

12. The first TP of claim 10, wherein transmission of the plurality of TBs is coordinated to transmit different TBs to the UE than the second TP.

13. The first TP of claim 8, wherein the feedback information comprises at least one of a channel access rate information that is determined based on a listen before talk (LBT) protocol and channel state information received from the UE through the first and second TPs.

14. The first TP of claim 13, wherein the feedback information further comprises the inter-TP coordinated information.

15. The first TP of claim 8, wherein a retransmission based on a radio link protocol is performed either by the first TP or the second TP, when the first TP is unable to re-transmit a hybrid automatic repeat and request (H-ARQ) data packet to the UE.

16. A method for a coordinated transmission in a wireless communication system, the method comprising:

receiving, by a network entity (NE), feedback information from multiple transmit points (TPs) operating in a cell providing license assisted access (LAA);

processing, by the NE, the feedback information from the multiple TPs;

selecting, by the NE, the multiple TPs that perform a coordinated transmission to a user equipment (UE) based on the feedback information received from the multiple TPs, wherein the feedback information comprises information associated with a channel access rate that is a measure of a probability that the multiple TPs are able to pass clear channel assessment (CCA) and gain access to a channel, and wherein the channel access rate is a ratio of a total number of idle CCA slots over a total number of CCA slots;

generating, by the NE, scheduling information for the coordinated transmission by the multiple TPs to the UE in accordance with the feedback information using the LAA; and transmitting, by the NE, the scheduling information to the multiple TPs.

17. The method of claim 16, further comprising:

segmenting a data packet into a plurality of transport blocks (TBs) in accordance with the feedback information received from the multiple TPs; and scheduling a number of the TBs to be transmitted to the UE through the multiple TPs.

18. The method of claim 16, wherein the feedback information comprises at least one of a channel access rate information that is determined based on a listen before talk (LBT) protocol and channel state information received from the UE through the multiple TPs.

* * * * *